Oct. 19, 1954 P. ZALKIND 2,692,019
EXPANDED SHEET AND METHOD FOR MAKING SAME
Filed March 14, 1945 3 Sheets-Sheet 1
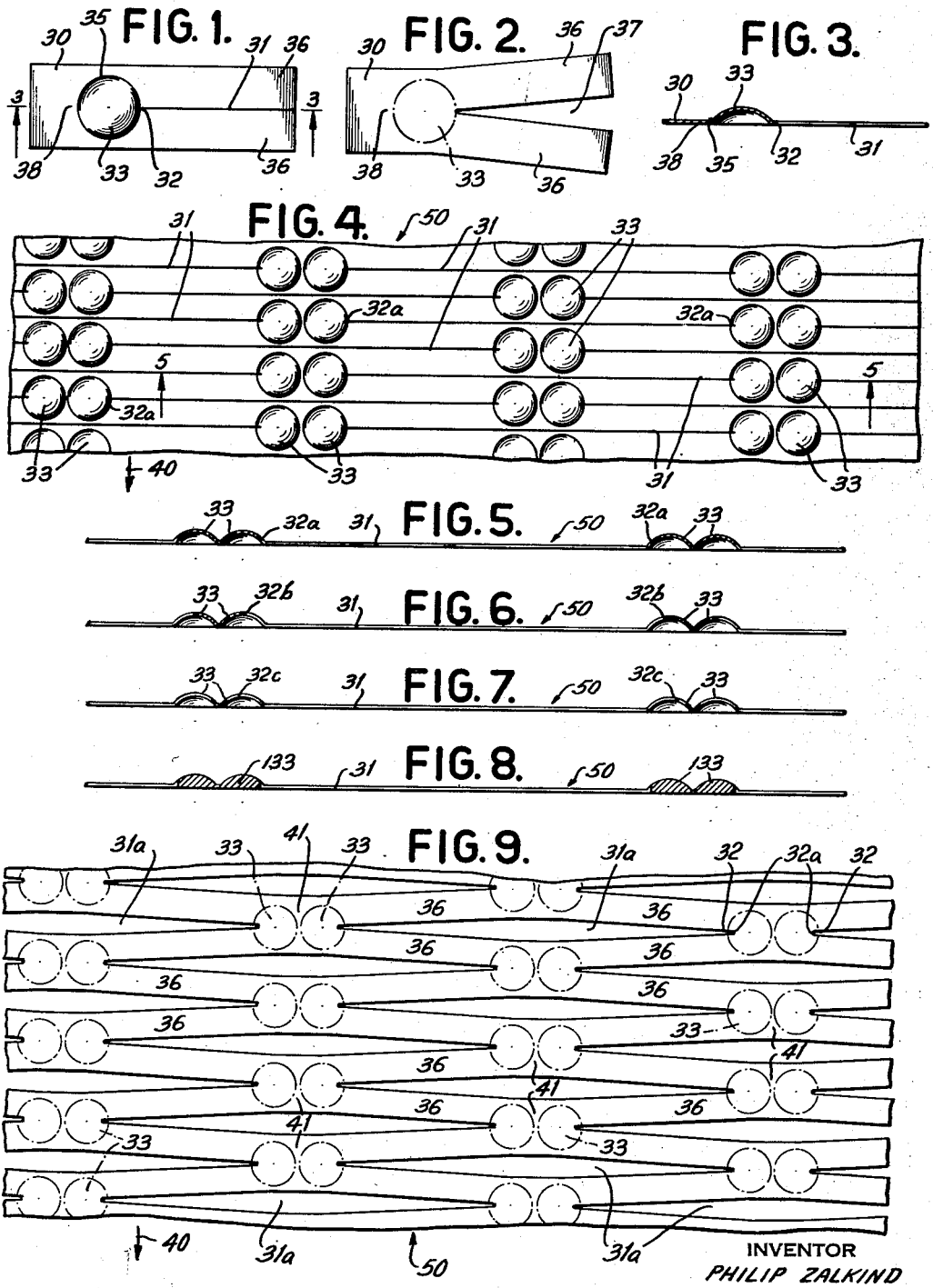
INVENTOR
PHILIP ZALKIND
BY
Ostrolenk and Faber
ATTORNEYS Oct. 19, 1954 P. ZALKIND 2,692,019
EXPANDED SHEET AND METHOD FOR MAKING SAME
Filed March 14, 1945 3 Sheets-Sheet 2
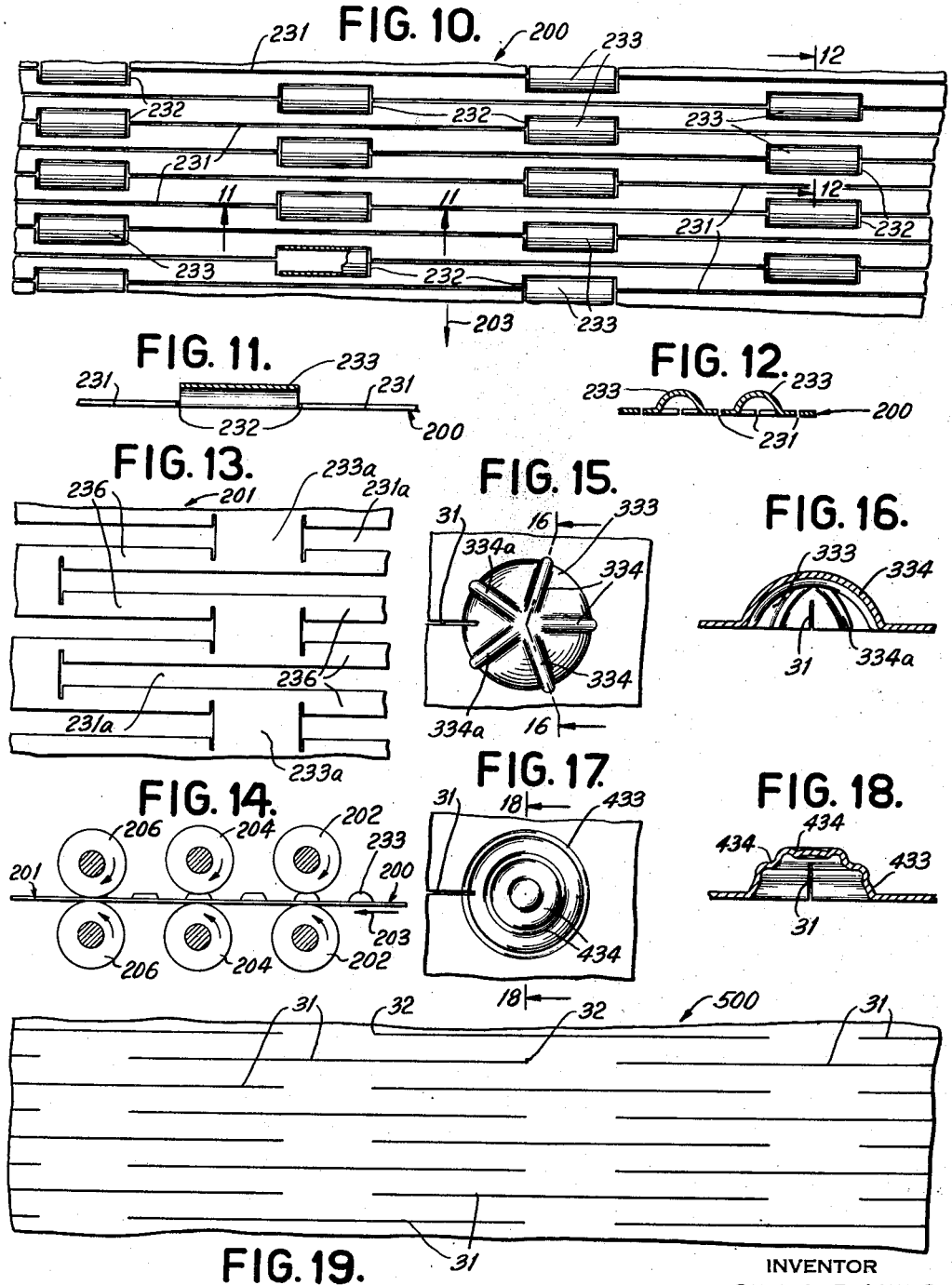
INVENTOR
PHILIP ZALKIND
BY
ATTORNEY Oct. 19, 1954   P. ZALKIND   2,692,019
EXPANDED SHEET AND METHOD FOR MAKING SAME
Filed March 14, 1945   3 Sheets-Sheet 3
FIG. 20.
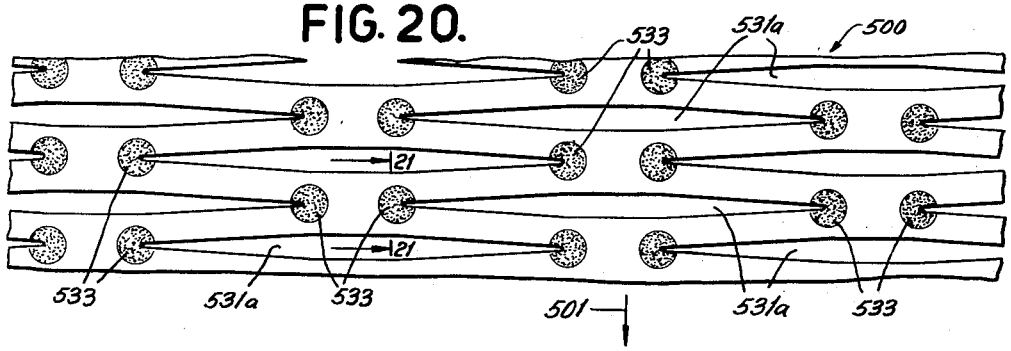
FIG. 21.
FIG. 22.
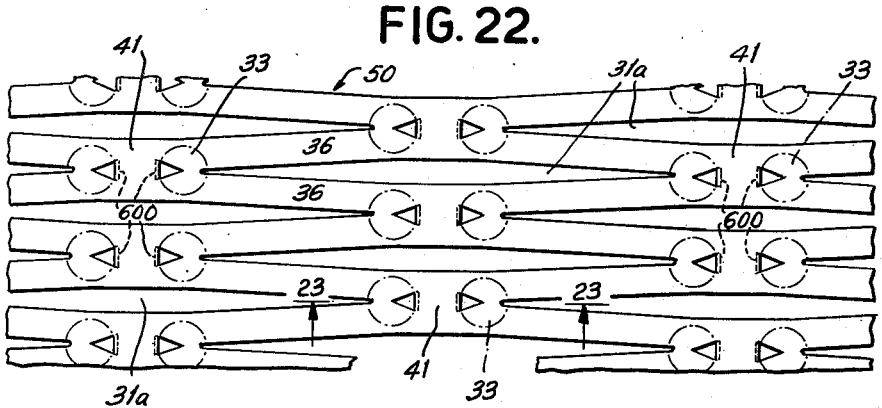
FIG. 23.
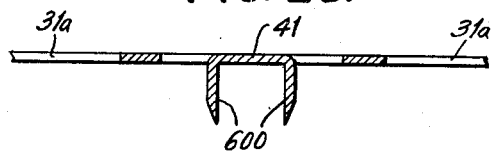
INVENTOR
*PHILIP ZALKIND*
BY
*Ostrolenk and Faber*
ATTORNEY Patented Oct. 19, 1954

2,692,019

UNITED STATES PATENT OFFICE 2,692,019

EXPANDED SHEET AND METHOD FOR MAKING SAME

Philip Zalkind, New York, N. Y.; Albert M. Zalkind and Mollie Zalkind, administrators of Philip Zalkind, deceased Application March 14, 1945, Serial No. 582,755

7 Claims. (Cl. 164—6.5)

My present invention relates to expanded material and processes for manufacturing the same, and more particularly to expanded sheet metal material where all of the elements of the expanded sheet metal extend in a single plane and to an improved method wherein this result may be obtained without the necessity for any special treatment of the expanded sheet material immediately after expansion.

Expanded sheet material at present is extensively used for numerous purposes. It is produced by successive slitting operations by means of serrated knife or die blades which produce and stretch strands and form bonds. These strands and bonds emerged at a sharp angle to the plane of the sheet. The sheet, though expanded, then has a greatly enlarged overall thickness or bulk.

Previous so-called flat expanded metal was produced by subsequent operations comprising reprocessing sheets thus produced, including further stretching and flattening operations. Other methods of producing flat foraminous or reticulate sheet material involves punching out operations with obvious waste of material.

Previous methods were subject to serious limitations, for instance with respect to the thickness or gauge of material in relation to width and length of the strands and bonds.

With my novel sheet and method for producing the same, I can produce combinations of sheet thickness and width and length of bonds and strands heretofore thought impossible or commercially impractical. I can therefore produce an economical flat foraminous sheet, of for instance very light gauge metal, with longer and broader strands and bonds than has been heretofore thought practical.

A primary object of my invention, therefore, is the formation of an expanded sheet material.

Another object of my invention is the provision of a simplified readily operable process for producing a novel flat expanded sheet material.

Specifically, my invention contemplates that the sheet be initially expanded somewhat at the ends of the slits to provide additional area at these ends and when this expanded material is pressed to the flatness of the original sheet, it will tend to part the edges at the slit at the end of which it lies. This initial expanded section may be formed as integral beads in the sheet during the manufacture of the initial sheet; it may be embossed in the sheet forming dimples or blisters before or after slitting, or it may be in effect obtained where the sheet is sufficiently thick simply by compressing and then dilating the material at the ends of the slits after the slits have been formed.

Accordingly a further object of my invention is the provision of a process for making expanded or foraminous sheet material which embodies initially expanding relatively small portions of the sheet material at the ends of the slits and then compressing the small expanded areas to obtain an expansion of the sheet.

Another and important object of my invention is that in the practice thereof it is not necessary to subject the sheet to tentering to obtain expansion. The dilating of the bead, boss, or bond area expands the sheet.

The foregoing and many other objects of my invention will become apparent in the following description and drawings in which Figure 1 is a plan view of a metallic strip illustrating in one form the basic principle of my invention.

Figure 2 is a plan view of the strip of Figure 1 expanded.

Figure 3 is a cross-sectional view taken on line 3—3 of Figure 1.

Figure 4 is a plan view of a sheet of material prepared for expansion.

Figure 5 is a cross-sectional view taken on line 5—5 of Figure 1 looking in the direction of the arrows.

Figure 6 is a cross-sectional view corresponding slightly to that of Figure 5 showing a slightly different formation of the slit.

Figure 7 is a cross-sectional view corresponding to those of Figures 5 and 6 showing another slight variation in the form of the slit.

Figure 8 is a cross-sectional view corresponding to that of Figure 5 showing the utilization of a bead rather than a boss to obtain expansion.

Figure 9 is a plan view of the sheet of Figure 4 expanded.

Figure 10 is a plan view of a slightly modified form of sheet prepared for expansion.

Figure 11 is a cross-sectional view taken on line 11—11 of Figure 10.

Figure 12 is a cross-sectional view taken on line 12—12 of Figure 10.

Figure 13 is a plan view of the sheet of Figure 10 expanded.

Figure 14 is a schematic view showing one simplified process by which the sheet of Figure 10 may be expanded.

Figure 15 is a plan view of a modified form of boss for utilization in expanding my sheet material.

Figure 16 is a cross-sectional view taken on line 16—16 of Figure 15.

Figure 17 is a cross-sectional view of another form of boss for utilization in my expanded sheet material.

Figure 18 is a cross-sectional view taken on line 18—18 of Figure 17.

Figure 19 is a plan view of a sheet of material prepared in a modified manner for expansion.

Figure 20 is a plan view of the sheet of Figure 19 expanded by my novel process.

Figure 21 is a cross-sectional view taken on line 21—21 of Figure 20.

Figure 22 is a plan view of expanded sheet material corresponding to that of Figure 9 but showing the formation of securing prongs in the expanded sheet material.

Figure 23 is a cross-sectional view taken on line 23—23 of Figure 22.

Referring now to Figures 1, 2 and 3, I have shown one form embodying a simple example of the basic principle of my invention. The metallic strip 30 is provided with a slit 31. The closed end 32 of the slit 31 terminates at the boss 33. When the material forming the boss 33 is flattened, the strips 36, 36 on either side of slit 31 are forced to separate spreading to form the forked opening 37.

It will be noted that the opposite side of the boss at 38 is unslit and untreated. In particular cases where necessary or desirable, area 38 on the opposite side of boss 33 from slit 31 may be reinforced or strengthened by a suitable corrugation transverse to the axis of slit 31.

In Figures 4 and 5 I have shown a sheet 50 which has been provided with a plurality of rows of slits 31, the slits in adjacent rows being staggered or in break-joint relation with respect to each other, each of the slits 31 extending to a boss 33. While in Figure 1 I have shown the end 32 of slit 31 extending to the boundary 35 of boss 33, in Figures 4 and 5 I have shown a formation in which section 32a of the slit extends slightly onto the boss 33. This, in some instances, is of advantage in spreading of the material from the line of slit 31.

Where the slit 31 is, as in Figure 6, extended even further as at 32b into the boss 33, then even a greater spreading may result but the bond hereinafter described will be shorter.

In Figure 7, the slit 31 has an extension 32c almost entirely through the boss 33; a greater spreading of the material will thus occur but the bond hereinafter described will be greatly reduced.

In Figure 8 I have shown a cross-sectional view illustrating a modified form of the sheet of Figure 4 where instead of a boss or dimple 33, a solid bead 133 is used, the said bead 133 being integrally formed with the sheet material prior to slitting.

The principles previously described in connection with boss 33 of Figure 1 are equally applicable to the bead 133 of Figure 8.

It will be obvious with respect to Figure 4 that the slits 31 may be formed in any suitable manner and the bosses 33 may similarly be formed in any suitable manner, that they can be formed simultaneously to facilitate accurate registry with each other, but that either the bosses or the slits may be formed first.

In Figure 9 I have shown the sheet of Figure 4 expanded by the flattening and compression of the bosses 33 into the plane of the sheet. This has resulted in the spreading of the strands 36 on either side of the slits 31 to form diamond-shaped openings. The boss portion 33 (or beads 133 when the Figure 8 construction is used) have been pressed down into the plane of the sheet. This pressure along has resulted in the separation of the strands 36 from the line of the slit 31 to form the diamond-shaped openings 31a.

The flattening or compression of the bosses or beads may be accomplished either by press or roller operation in any manner known in the art of working sheet material.

When the expanded sheet of Figure 9 is thus formed, the flattened bosses 33 become part of the bonds 41 between the strands. It will thus be noted that each of the diamond-shaped openings 31a is defined by four strands 36 connected by four bonds 41. It will also be seen that where the Figure 1 or Figure 5 slit is used, the bond 41 will be substantially wide. That is, the bond will always have the length of two strands 36 in a direction transverse to the slits but will have a width in a direction parallel to the slits determined by the spacing between the ends 32 of the slits.

In the Figures 4 and 9 construction, the slits 31 have extensions 32a beyond their ends 32 into the bosses 33, and the bonds 41 in the final Figure 9 construction are thus slightly narrowed in width. Where the Figure 6 slit construction is used, the bond 41 will be narrower since the distance between slits 32b will be less.

With the Figure 7 construction the bond 41 will be narrowest since the distance between the ends 32c of adjacent slits in the same line will be very little. Accordingly the spacing of the ends of the slits in single line with respect to each other will to a great extent determine the degree of expansion while the limiting factor nevertheless remains that the bond should not be made too small for the particular services to which the expanded sheet is to be used.

In Figure 10 I have shown a modified form of sheet prepared for expansion. In this case the lines of slits 231 are arranged and staggered in lines of slits in the same manner as are the slits 31. Each of the slits 231, however, communicates with small cross-slits 232, 232 at their ends, so that each of the slits 231 combines with a pair of slits 232 to have an I formation.

Between the slits 232 are flute or rib formations 233 as may readily be seen in Figure 10 and the cross-sectional views of Figures 11 and 12. These, too, may be either boss or solid formations, as in the case of the round formations of Figures 1 and 8.

The flattening or pressing down of the formations 233 in the manner previously described will result in the expansion of the sheet of Figure 10 into the expanded sheet of Figure 13 producing a series of staggered rectangular openings 231a in the expanded sheet defined by strands 236 and connected by bonds 233a.

In Figure 14 I have shown very schematically one method (not necessarily preferred) for obtaining the expansion above described. The sheet 200 of Figure 10 is fed between the pair of rollers 202 which are spaced slightly closer to each other than the height of the formations 233. The feeding direction of the sheet 200 is in the direction indicated by the arrows 203 of Figures 10 and 14. The rollers 202 press down the bosses 233.

The next pair of rollers 204 is more closely spaced and presses the bosses 233 down further. The next pair of rollers 206 is spaced apart by no more than the thickness of the original material itself and presses the bosses 233 down into the plane of the sheet 200. The sheet then emerges from rollers 206 as the expanded sheet 201. The same operation as shown in Figure 14 may be utilized with respect to the construction of Figures 1 through 9.

The number of sets of pressure rollers used will be determined by the height of the bosses and the malleability of the material.

The bosses or projecting portions 33 or 233 need not necessarily be of circular or cylindrical shape but may vary in shape and dimension, and the slits and dilation areas need not be in staggered or break-joint relation to produce varying desired results in spread, spacing and arrangement of openings, strands and bonds.

In Figure 15 I have shown a boss 333 having a plurality of ribs 334 therein radiating from a central point on the boss. The slit 31 enters partly into the boss 333 in a manner similar to that shown in Figure 5. The presence of the ribs 334 ensures that the material of boss 333 will be regularly compressed and displaced and that each of the elements of the bosses 333 between ribs 334 will be confined and expand substantially within that area.

In a slightly modified form it may improve the expansion substantially if the two ribs 334a are omitted. In this case the three ribs 334 will confine the two sections of the boss between them to expansion in that area while the remainder of the boss will be able to expand even more freely to spread the slit 31.

In Figure 18 I have shown a boss 433 in a sheet of material having a slit 31 wherein the boss 433 is concentrically corrugated at 434, 434. This produces more stretch of material within the periphery of the boss, and thus will produce a greater expansion.

In Figure 19 I have shown a sheet of material 500 having a plurality of rows of slits 31, slits in adjacent rows being staggered with respect to each other wherein, however, no preliminary bosses or beads are formed at the apices 32 of the slits.

When, as shown in Figures 20 and 21, the material between the ends 32 of the slits is compressed by any suitable pressure, spreading or dilating means to form the depressions 533, then as previously described separation and spreading of the strands occurs as in the use of bosses or beads.

The malleable material is caused to dilate or flow outward within the thickness of the sheet. Accordingly the strands are caused to spread from the line of the slits 31 to form the openings 531a.

In Figures 22 and 23 I have shown a slight modification of the expanded sheet of Figure 9 wherein the bonds 41 have prongs 600 driven down out of the material of the sheet. Thus, where metallic material is involved, prongs of any suitable type may be formed in either the bonds or the strands, or both, and comprise an effective means for securing the expanded sheet to other material with which it is desired to bring it in laminar combination. Similarly, prongs may be formed extending from both sides of the sheet.

Thus, where a wooden or fibre board packing case is to be reinforced, the lattice sheet of Figure 22 may be secured to the material thereof, the prongs 600 integrating the sheet of Figure 22 with the material of the case and immeasurably strengthening the case, yet with great economy by reason of the lattice-work form of the reinforcement. By this means much lighter and even inferior material not otherwise suitable for the purpose may, in this combination, form a structure far superior to ordinary materials now in use but critical in supply. Accordingly the sheet of Figure 22 will make possible a formation of strong containers with an overall effectiveness such as is not obtained by the conventional metal strapping, wire binding and other means now in use.

It is clear, of course, that the sheets of Figures 4, 9, 13 and 20 may be readily secured in any suitable manner to other sheet material for strengthening the same, as for instance by glue, staples and nails. Also the various expanded sheets of my invention may be laminated between two or more other sheets of material or be applied to both sides of other material to add substantially to their tensile strength and to restrict or prevent warping.

A sheet of plywood formed with one of my expanded sheets as one of its layers, will have its tensile strength increased to a degree heretofore thought impossible, and in addition, will have an internal flexible structure which will hold the elements of the plywood together even should the plywood be cracked or bent.

In appropriate cases my expanded sheet material may be used by itself, as for instance as a screening material where flat surfaces are required which will not injure materials or animals which may press against the screen.

My novel expanded material may, of course, be modified in many ways to increase its strength or other properties. Thus, for instance, the strands 36 of Figure 4 may be longitudinally or transversely fluted or corrugated. The transverse corrugations of the strands 36 would tend to make them more flexible along their major axes and more rigid transversely. The longitudinal flutes or corrugations 36 will stiffen the whole sheet.

The bonds 41 may also be corrugated or otherwise shaped to strengthen or rigidify the sheet in a particular direction for a particular purpose.

By means of the foregoing process including the flattening of bosses or beads or by compression in the material itself, I simplify the process of manufacturing expanded sheet materials. This process is applicable to many materials, such even as paper, not heretofore suitable for this purpose. My novel sheet immediately after expansion is flat in form without need of any further flattening operations.

The various methods herein described may be used in combination. Thus, the boss of Figure 8 may first be used; and after expansion is obtained, the bonds may be dimpled as in Figure 5 and further expansion obtained; thereafter, further compression as in Figures 20 and 21 may be used for still further expansion. The material may be annealed between operations where necessary. Also, various combinations of the methods and operations herein described may be used to obtain special forms, openings or holes heretofore obtainable only by punching operations; and special shapes of the bands and strands may be obtained where desired.

In the foregoing I have described my invention only in connection with specific embodiments thereof. Since many modifications and variations should now be obvious to those skilled in the art, I prefer to be bound not by the specific disclosures herein but only the appended claims.

I claim:

1. A sheet to be expended; said sheet having a plurality of rows of aligned slits, the material of the sheet between slits in each row being provided with a hollow blister formation, said formations being spaced from the slits in adjacent rows, said slits extending at least up to respective formations.

2. A method of forming an expanded sheet comprising the steps of making a plurality of rows of spaced slits in an unexpanded sheet, slits in each row being staggered with respect to slits in adjacent rows, providing raised formations between the ends of slits in each row, said formations being spaced from the slits in adjacent rows, said slits extending at least up to respective raised formations, and compressing said raised formations to expand said slits.

3. The method as set forth in claim 2, wherein said formations are compressed into the plane of the sheet, and the additional step of striking prongs from said compressed formations.

4. The method of forming an expanded sheet comprising the steps of making a plurality of rows of spaced slits in an unexpanded sheet, slits in each row being staggered with respect to slits in adjacent rows, forming hollow blisters between the ends of slits in each row, said blisters being spaced from the slits in adjacent rows, said slits extending at least up to respective blisters, and compressing the blisters substantially into the plane of the sheet to expand said slits.

5. The method of forming an expanded sheet comprising the steps of making a plurality of rows of spaced substantially parallel slits in a unexpanded sheet, forming blisters between the ends of adjacent slits in each row, said slits extending at least up to respective blisters, said blisters being spaced from the slits in adjacent rows, and compressing the blisters substantially into the plane of the sheet to expand said slits.

6. A sheet to be expanded; said sheet having a plurality of rows of aligned slits, the material of the sheet between slits in each row being raised into a blister of substantially arched elongated hollow formation having its axis along the axis of the row of slits, said slits extending up to respective formations, said formations being spaced from the slits in adjacent rows.

7. A sheet to be expanded; said sheet having a plurality of rows of aligned slits, the material of the sheet between slits in each row being expanded into a blister of substantially semi-cylindrical hollow formation having its axis along the axis of the row of slits, said semi-cylindrical formations being spaced from the slits in adjacent rows, said slits extending up to respective semi-cylindrical formations; and cross slits at each end of the expanded cylindrical formations.

References Cited in the file of this patent

UNITED STATES PATENTS

| Number | Name | Date |
|---|---|---|
| 297,382 | Golding | Apr. 22, 1884 |
| 821,843 | White | May 29, 1906 |
| 891,822 | Delano | June 30, 1908 |
| 964,624 | Doran | July 19, 1910 |
| 1,166,888 | Clark | Jan. 4, 1916 |
| 1,733,778 | Connell | Oct. 29, 1929 |
| 1,759,481 | Dougherty et al. | May 20, 1030 |
| 1,777,076 | Cumfer | Sept. 30, 1930 |
| 1,991,206 | Harrison | Feb. 12, 1935 |
| 2,011,563 | Balfe | Aug. 20, 1935 |
| 2,018,085 | Otte | Oct. 22, 1935 |